United States Patent [19]

Rizzone

[11] 3,786,729
[45] Jan. 22, 1974

[54] LINER SEAL FOR RECIPROCATING PUMPS
[75] Inventor: Michael L. Rizzone, Dallas, Tex.
[73] Assignee: United States Steel Corporation
[22] Filed: June 22, 1972
[21] Appl. No.: 265,378

[52] U.S. Cl. .............................. 92/171, 277/212 F
[51] Int. Cl. ....................... F01b 11/02, F16j 15/00
[58] Field of Search..... 277/32, 212, 212 F; 92/169, 92/171

[56] References Cited
UNITED STATES PATENTS
3,628,427  12/1971  Bailey .................................. 92/169
2,407,076  9/1946  Harkness ............................. 277/32

Primary Examiner—William T. Dixson, Jr.
Assistant Examiner—Robert I. Smith
Attorney, Agent, or Firm—Walter P. Wood

[57] ABSTRACT

A liner seal for use in reciprocating pumps. The seal includes an insert of erosion- and corrosion-resistant material (for example stainless steel or titanium) placed between the liner and fluid-end piece. A gasket is interposed between the end face of the liner and the insert, and preferably another gasket of smaller diameter between the insert and the fluid-end piece. The insert enables fluid-tight seals to be maintained between the liner and the fluid-end piece through liner changes involving various liner bore sizes. In the event the insert itself is damaged, it is replaced readily, whereby it affords a renewable seal face for contact with the liner.

5 Claims, 1 Drawing Figure

PATENTED JAN 22 1974 3,786,729
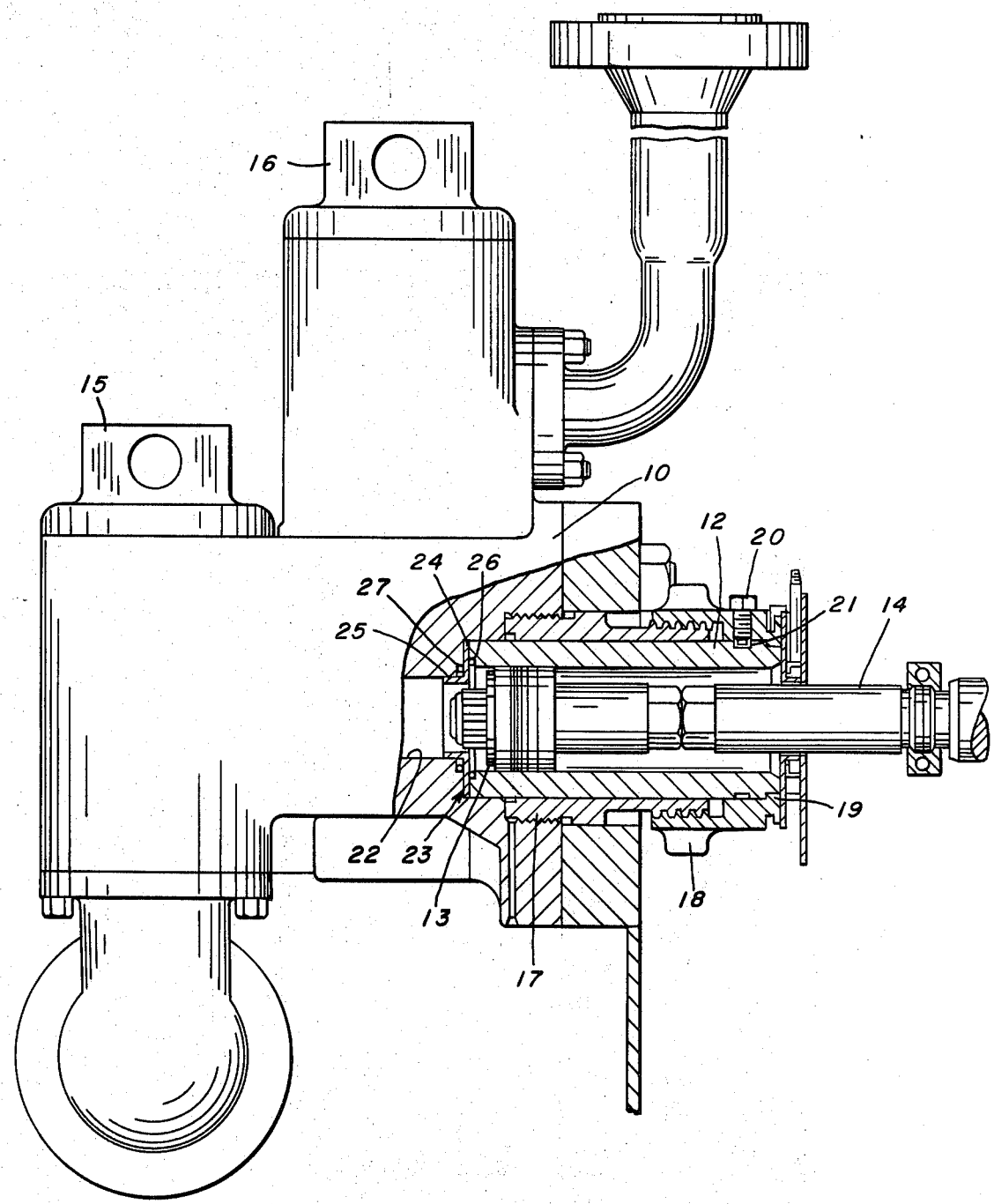

LINER SEAL FOR RECIPROCATING PUMPS

This invention relates to an improved liner seal for a reciprocating pump.

Although my invention is not thus limited, my liner seal is particularly useful when embodied in a single-acting triplex mud pump used in well-drilling. A conventional pump of this type includes fluid-end peices and liners, which are held in abutting relation by adapters threadedly engaged with the fluid-end pieces. Respective pistons are housed within the liners. Fluid-tight seals are required between the abutting faces of the liners and the fluid-end pieces. Heretofore the practice has been for the liner to abut the fluid-end piece directly, with only an O-ring or equivalent interposed therebetween to afford a seal. As hereinafter explained, this practice has led to difficulties, particularly when liners are replaced with liners of different bore diameter.

An object of may invention is to provide an improved liner sealing arrangement which assures a fluid-tight seal through liner changes.

A more specific object is to provide a seal for the foregoing purpose in which the liner abuts an insert of erosion-and corrosion-resistant metal, such as stainless steel or titanium, rather than abutting the fluid-end piece directly.

In the drawing:

The single FIGURE is a side elevational view, partly in section, of a pump in which my improved seal is used.

The drawing shows a pump which comprises a fluid-end piece 10, a liner 12, a piston 13 mounted for reciprocating movement in the liner, and a piston rod 14. The fluid-end piece usually is a forgoing, although it may be cast. The fluid-end piece has the usual suction and discharge valves 15 and 16. The liner is retained in position on the fluid-end piece 10 by an adapter 17 threadedly engaging the latter, a nut 18 threadedly engaging the adapter and having an internal flange 19 abutting a shoulder on the end of the liner, and a screw 20 threadedly engaging nut 18 and received within a groove 21 in the liner. The fluid-end piece has a chamber 22 which communicates with the bore of the liner.

In accordance with my invention, I place an insert 23 of erosion- and corrosion-resistant metal, such as stainless steel or titanium, between the end of the liner 12 and the face of the fluid-end piece 10. The insert includes an annular plate 24 and an integral short-length tubular extension 25. Plate 24 covers the face of the piece 10 which the liner otherwise would abut. The tubular extension 25 is press-fitted into the end of chamber 22 of the piece 10. I place an annular gasket 26 between the plate 24 and the end face of liner 12. I may rely solely on the press fit of the extension 25 in the chamber 22 to afford a seal against leakage between the fluid-end piece and the insert, but I prefer to place a second annular gasket 27 between plate 24 and the face of the fluid-end piece. The fluid-end piece and liner have circular grooves around their inner circumferences to receive the gaskets.

When I include the second gasket 27, I use a gasket of smaller overall diameter than the first gasket 26. Consequently fluid pressure which acts on the two gaskets acts on a larger area on gasket 26 than on gasket 27. Pressure on gasket 26 tends to force the insert 23 into chamber 22, while pressure on gasket 27 tends to unseat the insert. Hence the net hydraulic force on the two gaskets tends to maintain a tight seal; that is, the seating force is greater than the unseating force.

As wear takes place in the bore of liner 12, it becomes necessary from time-to-time to replace the liner. Because of changing drilling conditions, sometimes it is necessary to change the liner to one of different bore diameter to provide a different displacement. The diameter of the first gasket 26 varies with the bore diameter, since it is situated at the inner circumference of the liner, except for liners whose bore diameter approaches the minimum. Typically the diameter of the liner bore may vary from 4 to 7 inches. If the diameter of chamber 22 is 4 inches, which is typical, I prefer not to use a gasket 26 any smaller than 5½ inches overall diameter. As frequently occurs, a liner having a larger diameter bore may be replaced with a liner having a small diameter bore. In the absence of the insert 23 of my invention, erosion and corrosion of the exposed portion of the face of the fluid-end piece 10 make it difficult or impossible to obtain a satisfactory seal at this location when going to a smaller size liner bore. The problem is particularly acute in a salt-water environment. In the event the insert 23 itself is damaged, it may be replaced readily, whereby it affords a renewable seal face for contact with the liner. For example, if gasket 26 fails, a fluid cut may occur in the face of plate 24, necessitating replacement of the insert, but the fluid-end piece 10 remains undamaged. Use of my insert of erosion- and corrosion-resistant metal assures that a fluid-tight seal can be maintained over a long period of time through many changes of liner

I claim:

1. In a reciprocating pump which includes a fluid-end piece and a liner fixed to said piece, said piece having a chamber which communicates with the bore of said liner, the combination therewith of an improved sealing arrangement between said piece and said liner, said sealing arrangement comprising an insert having a tubular extension fitted into the end of said chamber and an integral annular plate covering the adjacent face of said piece, means affording a seal against leakage between said piece and said plate, the end face of said liner abutting said plate, an annular gasket between the end face of said liner and said plate near the inner circumference of said liner, said insert being of erosion- and corrsion-resistant metal, whereby a fluid-tight seal can be maintained through liner changes.

2. A sealing arrangement as defined in claim 1 in which the means affording a seal between said piece and said plate is a second annular gasket place therebetween.

3. A sealing arrangement as defined in claim 2 in which said first-named gasket is of larger diameter than said second-named gasket, whereby the net hydraulic force tends to maintain a tight seal at said insert.

4. A sealing arrangement as defined in claim 1 in which said insert is of stainless steel or titanium.

5. A sealing arrangement as defined in claim 1 in which said insert is replaceable, whereby it affords a renewable seal face for contact with said liner.

* * * * *